United States Patent
Liong

(10) Patent No.: US 12,507,041 B2
(45) Date of Patent: Dec. 23, 2025

(54) USER EQUIPMENT, BASE STATION, AND COMMUNICATION SYSTEM FOR MULTICAST AND BROADCAST SERVICES

(71) Applicant: Wistron Corporation, New Taipei (TW)

(72) Inventor: Jian Wah Liong, New Taipei (TW)

(73) Assignee: Wistron Corporation, New Taipei (TW)

( * ) Notice: Subject to any disclaimer, the term of this patent is extended or adjusted under 35 U.S.C. 154(b) by 322 days.

(21) Appl. No.: 18/335,074

(22) Filed: Jun. 14, 2023

(65) Prior Publication Data

US 2024/0388876 A1 Nov. 21, 2024

(30) Foreign Application Priority Data

May 18, 2023 (TW) .................. 112118502

(51) Int. Cl.
*H04W 4/06* (2009.01)
*H04W 72/30* (2023.01)
*H04W 76/40* (2018.01)

(52) U.S. Cl.
CPC ............ *H04W 4/06* (2013.01); *H04W 72/30* (2023.01); *H04W 76/40* (2018.02)

(58) Field of Classification Search
CPC ........ H04W 4/06; H04W 76/40; H04W 72/30
USPC ....... 370/259, 310, 328, 329, 338, 432, 433, 370/437, 465
See application file for complete search history.

(56) References Cited

U.S. PATENT DOCUMENTS

| 10,477,443 | B2 | 11/2019 | Ranta-Aho et al. |
| 2010/0074159 | A1 | 3/2010 | Yamada et al. |
| 2014/0010142 | A1 | 1/2014 | Ranta-Aho et al. |
| 2023/0070801 | A1 * | 3/2023 | Liu et al. .............. H04W 68/02 |
| 2023/0262423 | A1 | 8/2023 | Fujishiro et al. |

(Continued)

FOREIGN PATENT DOCUMENTS

| EP | 4472336 A2 * | 12/2024 | ........ H04W 12/0431 |
| JP | 2012135060 | 7/2012 | |

(Continued)

OTHER PUBLICATIONS

"3rd Generation Partnership Project; Technical Specification Group Services and System Aspects; Architectural enhancements for 5G multicast-broadcast services; Stage 2 (Release 18)", 3GPP TS 23.247, Mar. 2023, pp. 1-133, V18.1.0.

(Continued)

*Primary Examiner* — Huy D Vu
(74) *Attorney, Agent, or Firm* — JCIPRNET

(57) ABSTRACT

A user equipment (UE), a base station (BS), and a communication system for multicast and broadcast services (MBS) are disclosed. The UE receives a request message corresponding to a first MBS from the BS. The request message includes an indicator. In response to the request message, the BS and the UE perform a first data transmission corresponding to the first MBS through a packet data unit (PDU) session between the BS and the UE. In response to the indicator, the BS transmits a paging message to the UE. The paging message includes an identifier corresponding to a second MBS. In response to the identifier, the BS and the UE perform a second data transmission corresponding to the second MBS through a preconfigured second PDU session.

17 Claims, 8 Drawing Sheets

(56) References Cited

U.S. PATENT DOCUMENTS

2023/0380002 A1   11/2023  Hong
2023/0403537 A1\*  12/2023  Chou ...................... H04W 4/06

FOREIGN PATENT DOCUMENTS

| JP | 2014515227 | 6/2014 | |
|---|---|---|---|
| WO | 2021226848 | 11/2021 | |
| WO | 2022085757 | 4/2022 | |
| WO | 2022086109 | 4/2022 | |
| WO | 2022087106 | 4/2022 | |
| WO | WO-2022177417 A1 \* | 8/2022 | ........ H04W 36/1443 |
| WO | WO-2024036084 A1 \* | 2/2024 | .............. H04W 4/06 |
| WO | WO-2024076834 A1 \* | 4/2024 | .............. H04W 4/06 |
| WO | WO-2024167626 A1 \* | 8/2024 | ........ H04W 72/1273 |

OTHER PUBLICATIONS

"3rd Generation Partnership Project; Technical Specification Group Core Network and Terminals; 5G System; Interworking between 5G Network and external Data Networks; Stage 3 (Release 18)", 3GPP TS 29.561, Mar. 2023, pp. 1-99, V18.0.0.

\* cited by examiner

USER EQUIPMENT, BASE STATION, AND COMMUNICATION SYSTEM FOR MULTICAST AND BROADCAST SERVICES

CROSS-REFERENCE TO RELATED APPLICATION

This application claims the priority benefit of Taiwan application serial no. 112118502, filed on May 18, 2023. The entirety of the above-mentioned patent application is hereby incorporated by reference herein and made a part of this specification.

BACKGROUND

Technical Field

The disclosure relates to a wireless communication technology, and more particularly, to a user equipment (UE), a base station (BS) and, a communication system for multicast and broadcast services (MBS).

Description of Related Art

Under an architecture of the 5G network, a UE may receive MBS messages from a network terminal. After the UE joins the service provided by a base station supporting an MBS, the network terminal may inform the UE of the MBS that the base station may provide through a service announcement. The service announcement may carry an MBS session identifier (ID) through messages such as a temporary mobile group identity (TMGI) or a source specific IP multicast address. The MBS session ID may be associated with one or more MBS. The UE may join a specific MBS according to the MBS session ID. When the UE wants to join the MBS, the UE is required to initiate a session establishment procedure. When the UE wants to stop receiving the MBS, the UE is required to initiate a session release procedure. When the base station adds a new MBS that the UE is interested in, the UE is required to initiate the session establishment procedure again to receive the new MBS. In this way, frequent exchange of signaling between the UE and the base station will result in a waste of communication resources.

SUMMARY

The disclosure provides a user equipment, a base station, and a communication system for multicast and broadcast services, which may reduce the amount of signaling required for the UE to request a new MBS.

A user equipment for multicast and broadcast services in the disclosure includes a transceiver and a processor. The transceiver communicates with a base station. The processor is configured to transmit a request message corresponding to a first multicast and broadcast service to the base station, in which the request message includes an indicator; in response to transmitting the request message, perform a first data transmission corresponding to the first multicast and broadcast service through a first packet data unit session between the user equipment and the base station; in response to transmitting the indicator, receive a paging message from the base station, in which the paging message includes an identifier corresponding to a second multicast and broadcast service; and in response to receiving the identifier, perform a second data transmission corresponding to the second multicast and broadcast service through a preconfigured second packet data unit session.

In an embodiment of the disclosure, the second packet data unit session is the first packet data unit session.

In an embodiment of the disclosure, the processor is further configured to transmit a parameter for establishing the second packet data unit session to the base station before receiving the paging message.

In an embodiment of the disclosure, the base station belongs to a radio access network notification area, and the request message further includes information of a timer. In response to the user equipment leaving the radio access network notification area, the timer is started. In response to the timer expiring, the second packet data unit session is released.

In an embodiment of the disclosure, in response to the user equipment entering the radio access network notification area, the timer is stopped.

In an embodiment of the disclosure, the request message further includes a radio access network list request, and the processor is further configured to receive the second multicast and broadcast service provided by the base station through a first radio access network; in response to transmitting the radio access network list request, receive a radio access network list, in which the radio access network list includes a second radio access network; and hand over from the first radio access network to the second radio access network according to the radio access network list to perform the second data transmission corresponding to the second multicast and broadcast service.

In an embodiment of the disclosure, the processor is further configured to enter a radio resource control inactive state; in response to receiving the paging message, perform a radio resource control resume procedure to switch from the radio resource control inactive state to a radio resource control connection state; and perform the second data transmission during the radio resource control connection state.

In an embodiment of the disclosure, the request message includes one of a packet data unit session establishment request and a packet data unit session modification request.

In an embodiment of the disclosure, the indicator is included in an information element of extended protocol configuration options of the request message.

A base station for multicast and broadcast services in the disclosure includes a processor and a transceiver. The transceiver communicates with a user equipment. The processor is configured to receive a request message corresponding to a first multicast and broadcast service from the user equipment, in which the request message includes an indicator; in response to receiving the request message, perform a first data transmission corresponding to the first multicast and broadcast service through a first packet data unit session between the base station and the user equipment; in response to receiving the indicator, transmit a paging message to the user equipment, in which the paging message includes an identifier corresponding to a second multicast and broadcast service; and in response to transmitting the identifier, perform a second data transmission corresponding to the second multicast and broadcast service through a preconfigured second packet data unit session.

In an embodiment of the disclosure, the second packet data unit session is the first packet data unit session.

In an embodiment of the disclosure, the processor is further configured to receive a parameter for establishing the second packet data unit session from the user equipment before transmitting the paging message.

In an embodiment of the disclosure, the base station belongs to a radio access network notification area, and the request message further includes information of a timer. The processor is further configured to start the timer in response to detecting that the user equipment leaves the radio access network notification area, and release the second packet data unit session in response to the timer expiring.

In an embodiment of the disclosure, the processor is further configured to stop the timer in response to detecting that the user equipment enters the radio access network notification area.

In an embodiment of the disclosure, the request message further includes a radio access network list request, and the processor is further configured to provide the second multicast and broadcast service to the user equipment through a first radio access network; in response to receiving the radio access network list request, transmit a radio access network list, in which the radio access network list includes a second radio access network; and in response to transmitting the radio access network list, hand over the user equipment from the first radio access network to the second radio access network.

In an embodiment of the disclosure, the processor is further configured to configure the user equipment to enter a radio resource control inactive state; in response to transmitting the paging message, perform a radio resource control resume procedure to switch the user equipment from the radio resource control inactive state to a radio resource control connection state; and perform the second data transmission when the user equipment is in the radio resource control connection state.

In an embodiment of the disclosure, the request message includes one of a packet data unit session establishment request and a packet data unit session modification request.

In an embodiment of the disclosure, the indicator is included in an information element of extended protocol configuration options of the request message.

A communication system for multicast and broadcast services in the disclosure includes a user equipment and a base station. The user equipment receives a request message corresponding to a first multicast and broadcast service from the base station. The request message includes an indicator. In response to the request message, the base station and the user equipment perform a first data transmission corresponding to the first multicast and broadcast service through a first packet data unit session between the base station and the user equipment. In response to the indicator, the base station transmits a paging message to the user equipment. The paging message includes an identifier corresponding to a second multicast and broadcast service. In response to the identifier, the base station and the user equipment perform a second data transmission corresponding to the second multicast and broadcast service through a preconfigured second packet data unit session.

Based on the above, in the disclosure, the amount of signaling that is required to be exchanged between the UE and the base station may be significantly reduced, thereby achieving an effect of saving power for the UE.

DETAILED DESCRIPTION OF DISCLOSED EMBODIMENTS

Figure 1:
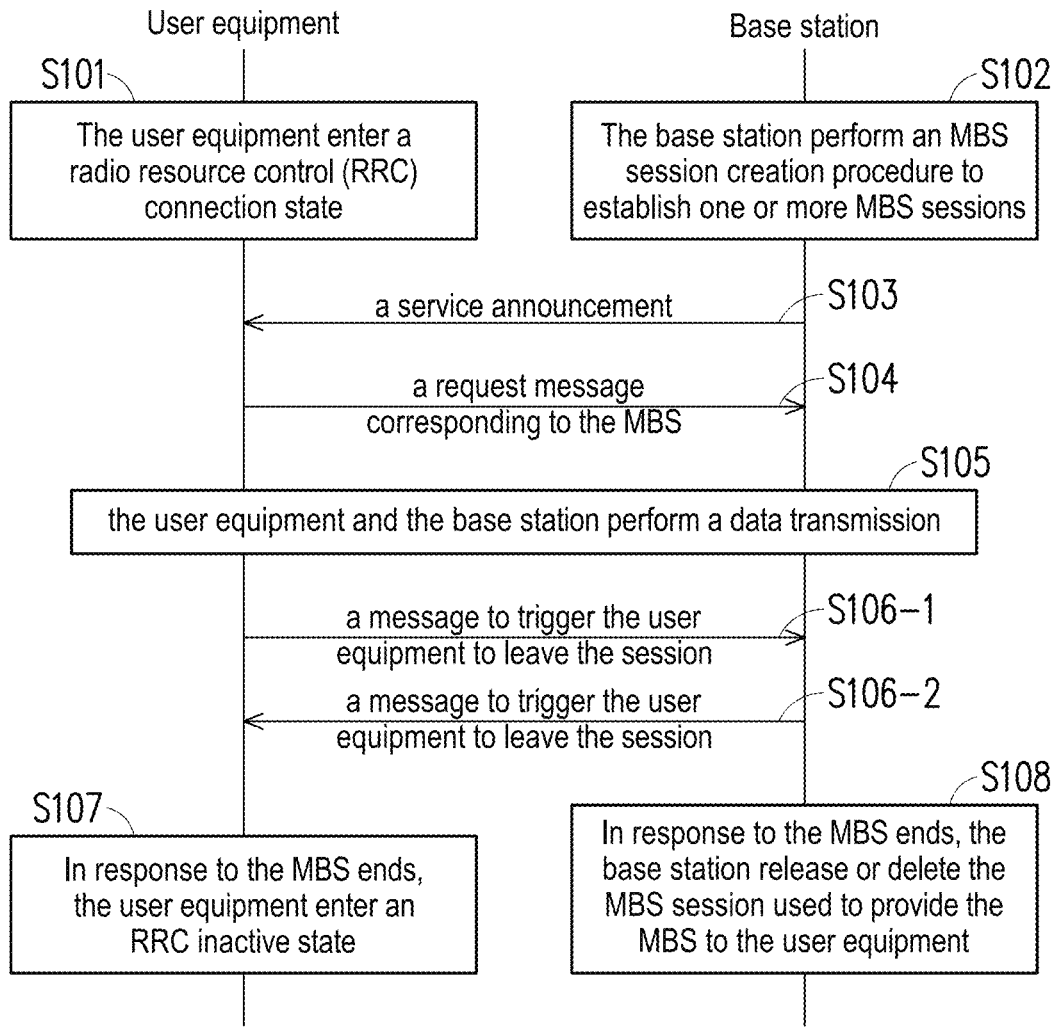
FIG. 1 is a signaling diagram of providing an MBS.

In order for the content of the disclosure to be more comprehensible, the following embodiments are taken as examples in which the disclosure may actually be implemented. In addition, wherever possible, elements/components/steps with the same reference numerals in the drawings and embodiments represent the same or similar parts.

FIG. 1 is a signaling diagram of providing an MBS. A base station may communicate with a user equipment. In step S101, the user equipment may enter a radio resource control (RRC) connection state. In step S102, the base station supporting the MBS may perform an MBS session creation procedure to establish one or more MBS sessions.

In step S103, the base station may transmit a service announcement to the user equipment. The service announcement may be carried by, for example, a TMGI or a source specific IP multicast address. The service announcement may include identifiers of one or more MBS that the base station may provide to the user equipment.

In step S104, the user equipment may transmit a request message corresponding to the MBS to the base station, so as to trigger joining or establishment of the session for the MBS. For example, the user equipment may transmit the request message including an identity of the requested MBS to the base station. The request message is, for example, a packet data unit (PDU) session establishment request or a PDU session modification request.

In step S105, the user equipment and the base station may perform a data transmission, so that the base station provides the MBS to the user equipment.

One of step S106-1 and step S106-2 may be performed to enable the user equipment to leave the session for providing the MBS (that is, enable the user equipment to stop receiving the MBS). In step S106-1, the user equipment may transmit a message to the base station to trigger the user equipment to leave the session. In step S106-2, the base station may transmit a message to the user equipment to trigger the user equipment to leave the session.

In step S107, when the MBS ends (for example, there is no MBS data to be transmitted to the user equipment), the user equipment may enter an RRC inactive state. In step S108, the base station may release or delete the MBS session used to provide the MBS to the user equipment.

According to the process in FIG. 1, every time the user equipment requests a new MBS, the session between the base station and the user apparatus is required to be re-established. Accordingly, a large amount of communication resources will be spent. As a result, the disclosure provides a process for providing the MBS, which may effectively reduce the amount of signaling between the base station and the user equipment.

Figure 2:
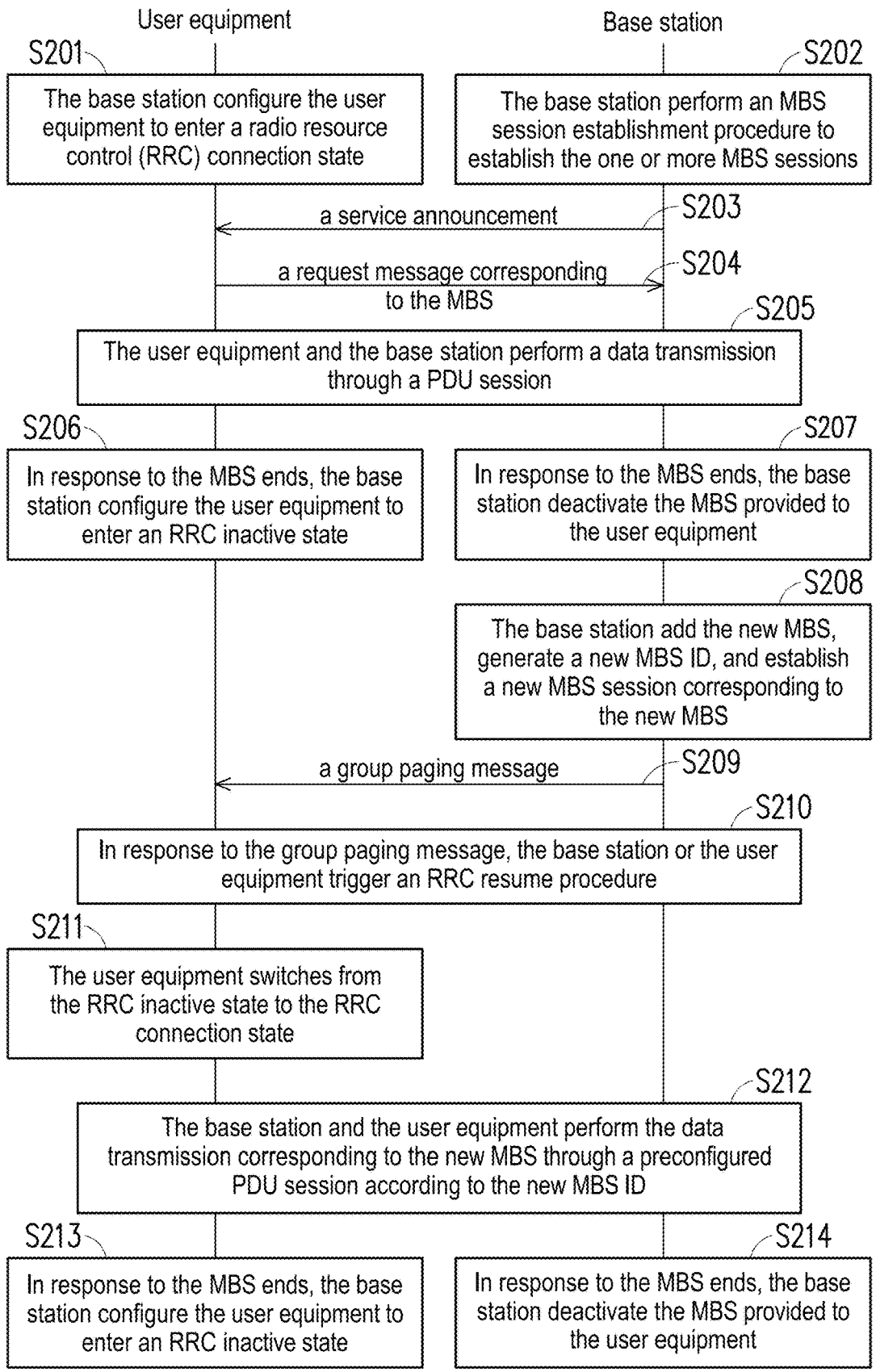
FIG. 2 is a signaling diagram of providing an MBS according to an embodiment of the disclosure.

FIG. 2 is a signaling diagram of providing an MBS according to an embodiment of the disclosure. It should be noted that the base station disclosed in the disclosure may also be regarded as a radio access network (RAN), a RAN notification area (RNA) including one or more RANs, a network terminal or core network, etc.

In step S201, the base station may configure the user equipment to enter the RRC connection state. In step S202, the base station supporting the MBS may perform an MBS session establishment procedure to establish the one or more MBS sessions. The one or more MBS sessions are respectively used to provide one or more MBS.

In step S203, the base station may transmit the service announcement to the user equipment. The service announcement may be carried by, for example, the TMGI or the source specific IP multicast address. The service announcement may include one or more identifiers of the one or more MBS that the base station may provide to the user equipment.

In step S204, the user equipment may transmit the request message corresponding to the MBS to the base station. The request message may include an indicator for instructing the user equipment to agree to join all the MBS that the base station may provide. The request message is, for example, the PDU session establishment request or the PDU session modification request. In an embodiment, the request message may further include information of a timer (e.g., a life cycle of the timer) or a RAN list request. The indicator, the information of the timer, or the RAN list request may be included in an information element (IE) of extended protocol configuration options of the request message (i.e., the PDU session establishment request or the PDU session modification request). The information element of the extended protocol configuration options may be used to store data of up to 65533 octets.

In step S205, the user equipment and the base station perform the data transmission corresponding to the MBS through a PDU session between the user equipment and the base station. The MBS may include the MBS announced by the base station to the user equipment in step S203. The base station may provide the user equipment with the MBS through the MBS session established in step S202. The user equipment may perform the data transmission of the MBS with the base station during the RRC connection state.

In step S206, when the MBS ends (for example, there is no MBS data to be transmitted to the user equipment), the base station may configure the user equipment to enter the RRC inactive state. In step S207, the base station may deactivate the MBS provided to the user equipment. In an embodiment, the base station may release or delete the MBS session corresponding to the deactivated MBS.

In step S208, the base station may add the new MBS. For example, the base station may receive a configuration for the new MBS from the core network, so as to add the new MBS according to the configuration. In addition, the base station may further generate an identifier corresponding to the new MBS (hereinafter referred to as a "new MBS ID"), and may establish a new MBS session corresponding to the new MBS.

In step S209, the base station may transmit a group paging message to each of the user equipments (including the user equipment shown in FIG. 2). The group paging message may include the new MBS ID corresponding to the new MBS.

In step S210, in response to the group paging message, the base station or the user equipment may trigger an RRC resume procedure, so that the user equipment switches from the RRC inactive state to the RRC connection state in step S211.

In step S212, the base station and the user equipment may perform the data transmission corresponding to the new MBS through a preconfigured PDU session according to the new MBS ID. The preconfigured PDU session may be the existing PDU session or a newly established PDU session. For example, the base station and the user equipment may perform the data transmission corresponding to the new MBS through the same PDU session as in step S205. The base station may provide the new MBS to the user equipment through the new MBS session established in step S208. The user equipment may perform the data transmission of the new MBS with the base station during the RRC connection state.

Parameters for establishing the new PDU session for the new MBS may be transmitted by the user equipment to the base station before the user equipment receives the group paging message (or the base station transmits the group paging message). Specifically, according to the description of the section 7.2.1.3 of the 3GPP standard technical specification 23.247, the user equipment may perform a registration procedure to establish the PDU session (that is, the above "existing PDU session") for the MBS before requesting the MBS. In a process of establishing the PDU session, the user equipment may transmit relevant information of the user equipment to the base station (or the network terminal). The relevant information includes, for example, information such as a data network name (DNN), single-network slice selection assistance information (S-NSSAI), or a subscription permanent identifier (SUPI). In an embodiment, the user equipment may transmit the parameters for establishing the new PDU session to the base station through the registration procedure. When the base station is about to provide the new MBS to the user equipment, the base station may provide the new MBS to the user equipment through the existing PDU session, or may establish the new PDU session according to the parameters of the user equipment obtained in the registration procedure, thereby providing the new MBS to the user equipment through the new PDU session.

In step S213, when the new MBS ends (for example, there is no MBS data to be transmitted to the user equipment), the base station may configure the user equipment to enter the RRC inactive state. In step S214, the base station may deactivate the new MBS provided to the user equipment. In an embodiment, the base station may release or delete the new MBS session corresponding to the deactivated new MBS.

In an embodiment, the request message transmitted by the user equipment to the base station may include the RAN list request. After the base station receives the RAN list request, the base station may transmit a RAN list recording one or more RANs supporting the MBS to the user equipment. It is assumed that the user equipment is currently performing the data transmission corresponding to the MBS provided by the base station through a RAN #1 (or referred to as a "source RAN"). When the base station provides the MBS to the user equipment, the user equipment may obtain a RAN #2 (or referred to as a "target RAN") supporting the MBS from the RAN list, and hand over from the RAN #1 to the RAN #2, so as to continue the data transmission of the MBS. The RAN list may prevent the data transmission of the MBS from being interrupted when the user equipment is handed over to the RAN that does not support the MBS. The user equipment and the RAN #2 may perform the data transmission of the MBS through the existing PDU session or the newly established PDU session. It should be noted that the RAN #1 and the RAN #2 may belong to the same RNA, or may belong to different RNAs respectively.

Figure 3:
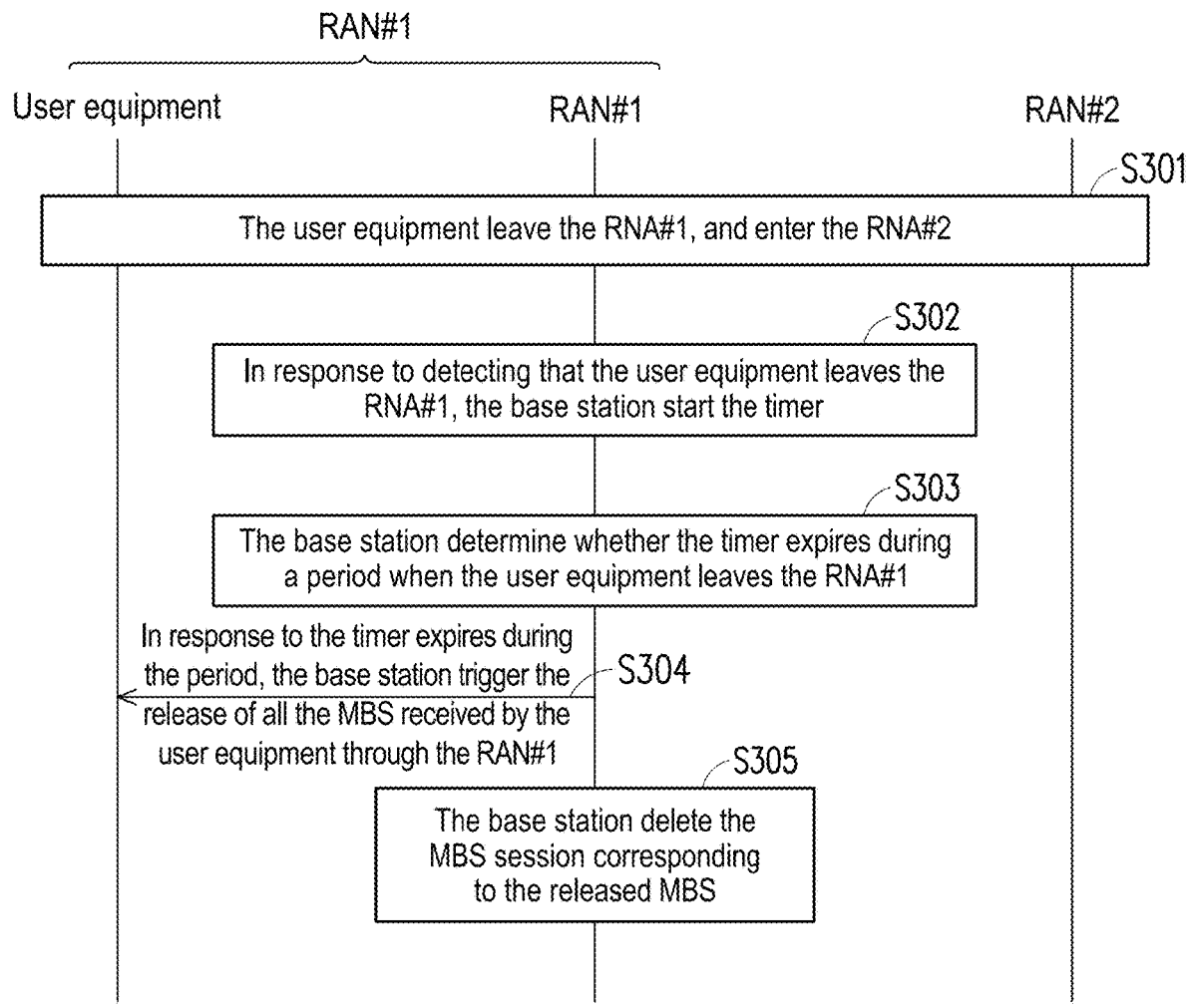
FIG. 3 is a signaling diagram of providing an MBS according to a timer according to an embodiment of the disclosure.
Figure 4:
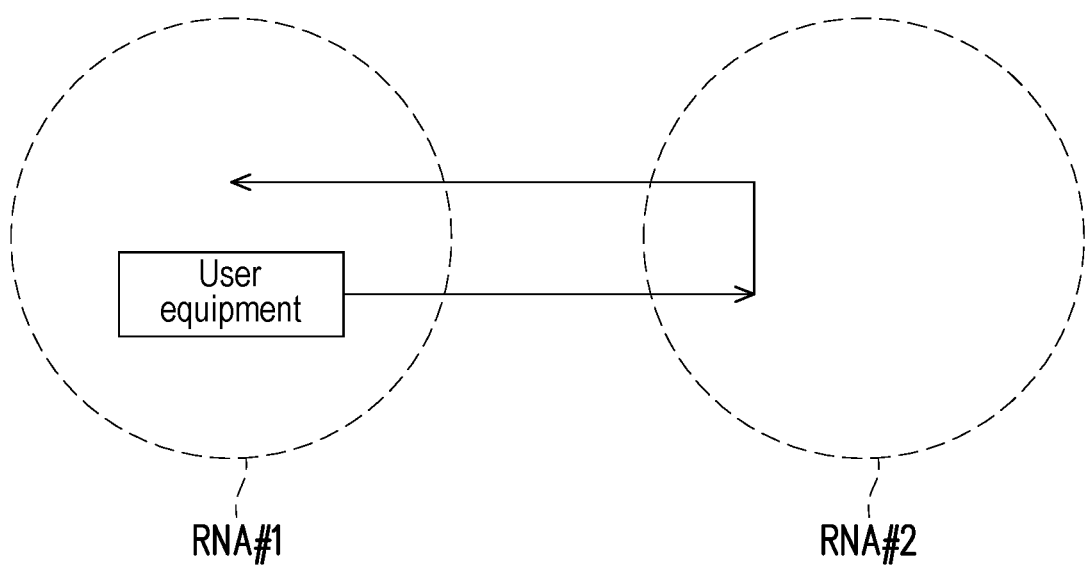
FIG. 4 is a schematic diagram of multiple radio access network notification areas according to an embodiment of the disclosure.

In an embodiment, the request message transmitted by the user equipment to the base station may include the related information of the timer. The base station may determine whether to release the PDU session for providing the MBS to the user equipment according to the timer. FIG. 3 is a signaling diagram of providing an MBS according to a timer according to an embodiment of the disclosure. FIG. 4 is a schematic diagram of multiple radio access network notification areas according to an embodiment of the disclosure. Referring to FIGS. 3 and 4, it is assumed that the user equipment and the RAN #1 are currently located in the RNA #1, and the user equipment is accessing the PDU session through the RAN #1 to receive the MBS.

In step S301, the user equipment may leave the RNA #1, and may enter the RNA #2. In step S302, in response to detecting that the user equipment leaves the RNA #1, the base station may start the timer. In step S303, the base station may determine whether the timer expires during a period when the user equipment leaves the RNA #1. If the timer expires during the period when the user equipment leaves the RNA #1, the base station may trigger the release of all the MBS received by the user equipment through the RAN #1 in step S304. On the other hand, the user equipment may be handed over to the RAN (e.g., the RAN #2) in the RNA #2, for example. In contrast, if the user equipment returns from the RNA #2 to the RNA #1 before the timer expires, the base station may stop or reset the timer. In step S305, the base station may delete the MBS session corresponding to the released MBS.

Figure 5:
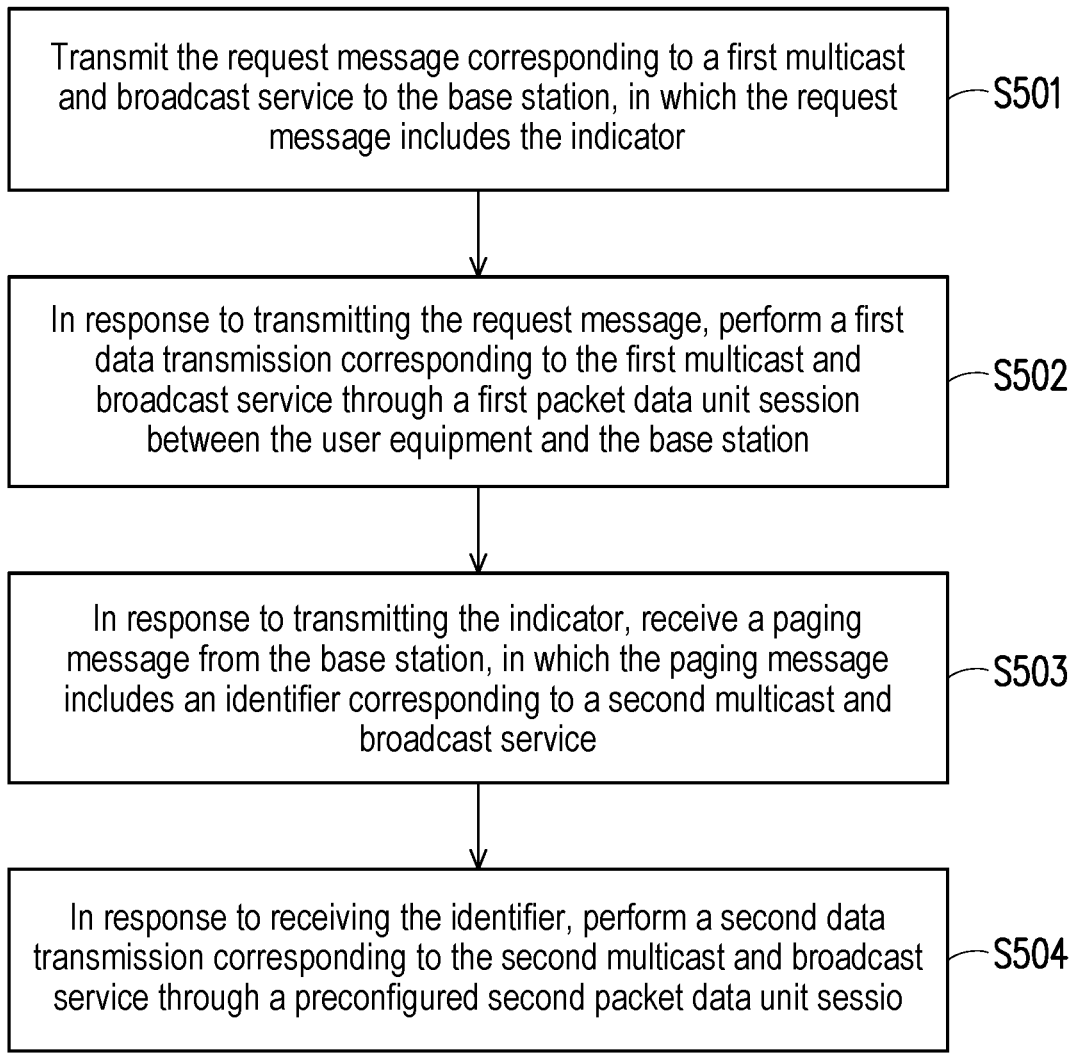
FIG. 5 is a flowchart of a method for an MBS applicable to a user equipment according to an embodiment of the disclosure.

FIG. 5 is a flowchart of a method for an MBS applicable to a user equipment according to an embodiment of the disclosure. In step S501, the request message corresponding to a first multicast and broadcast service is transmitted to the base station. The request message includes the indicator. In step S502, in response to transmitting the request message, a first data transmission corresponding to the first multicast and broadcast service is performed through a first packet data unit session between the user equipment and the base station. In step S503, in response to transmitting the indicator, a paging message from the base station is received. The paging message includes an identifier corresponding to a second multicast and broadcast service. In step S504, in response to receiving the identifier, a second data transmission corresponding to the second multicast and broadcast service is performed through a preconfigured second packet data unit session.

Figure 6:
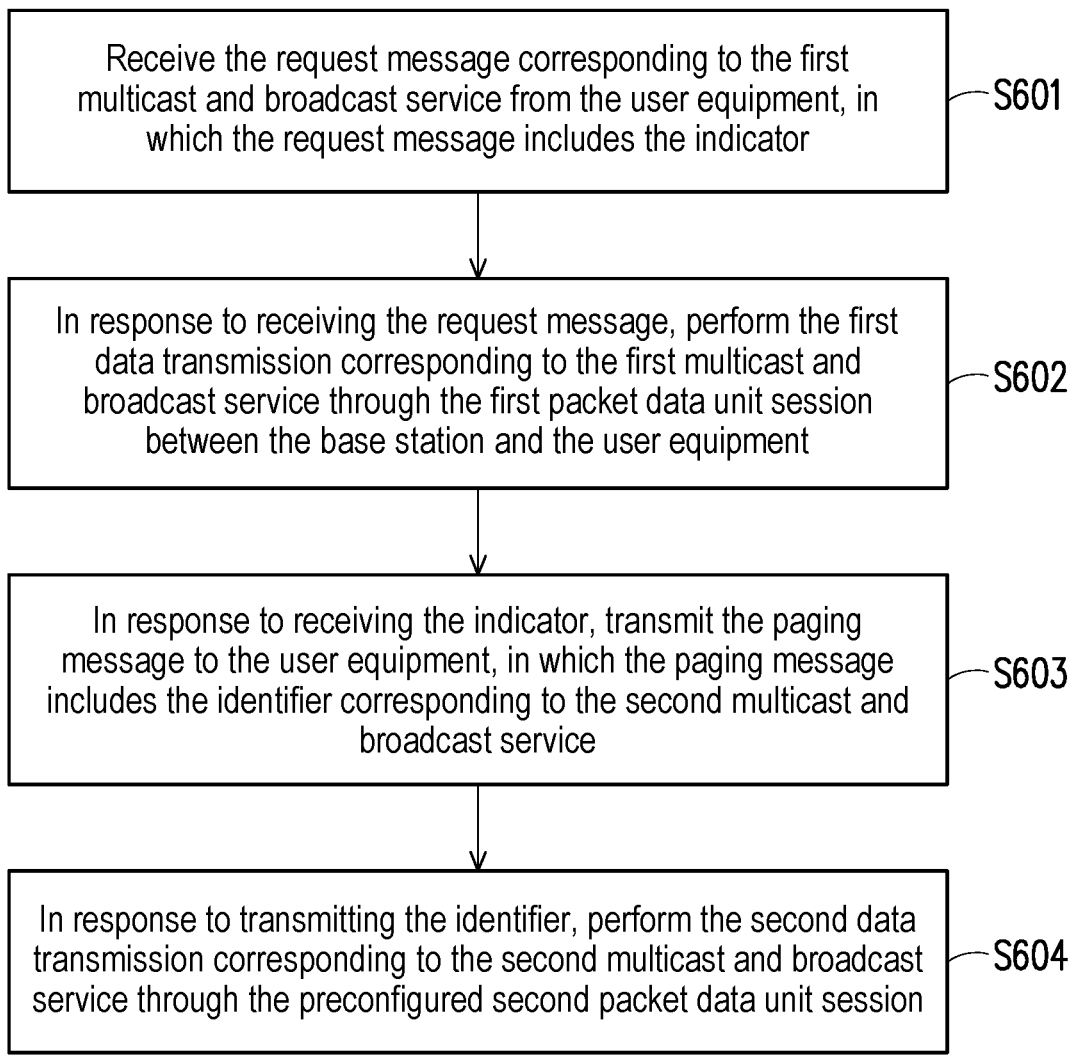
FIG. 6 is a flowchart of a method for an MBS applicable to a base station according to an embodiment of the disclosure.

FIG. 6 is a flowchart of a method for an MBS applicable to a base station according to an embodiment of the disclosure. In step S601, the request message corresponding to the first multicast and broadcast service is received from the user equipment. The request message includes the indicator. In step S602, in response to receiving the request message, the first data transmission corresponding to the first multicast and broadcast service is performed through the first packet data unit session between the base station and the user equipment. In step S603, in response to receiving the indicator, the paging message is transmitted to the user equipment. The paging message includes the identifier corresponding to the second multicast and broadcast service. In step S604, in response to transmitting the identifier, the second data transmission corresponding to the second multicast and broadcast service is performed through the preconfigured second packet data unit session.

Figure 7:
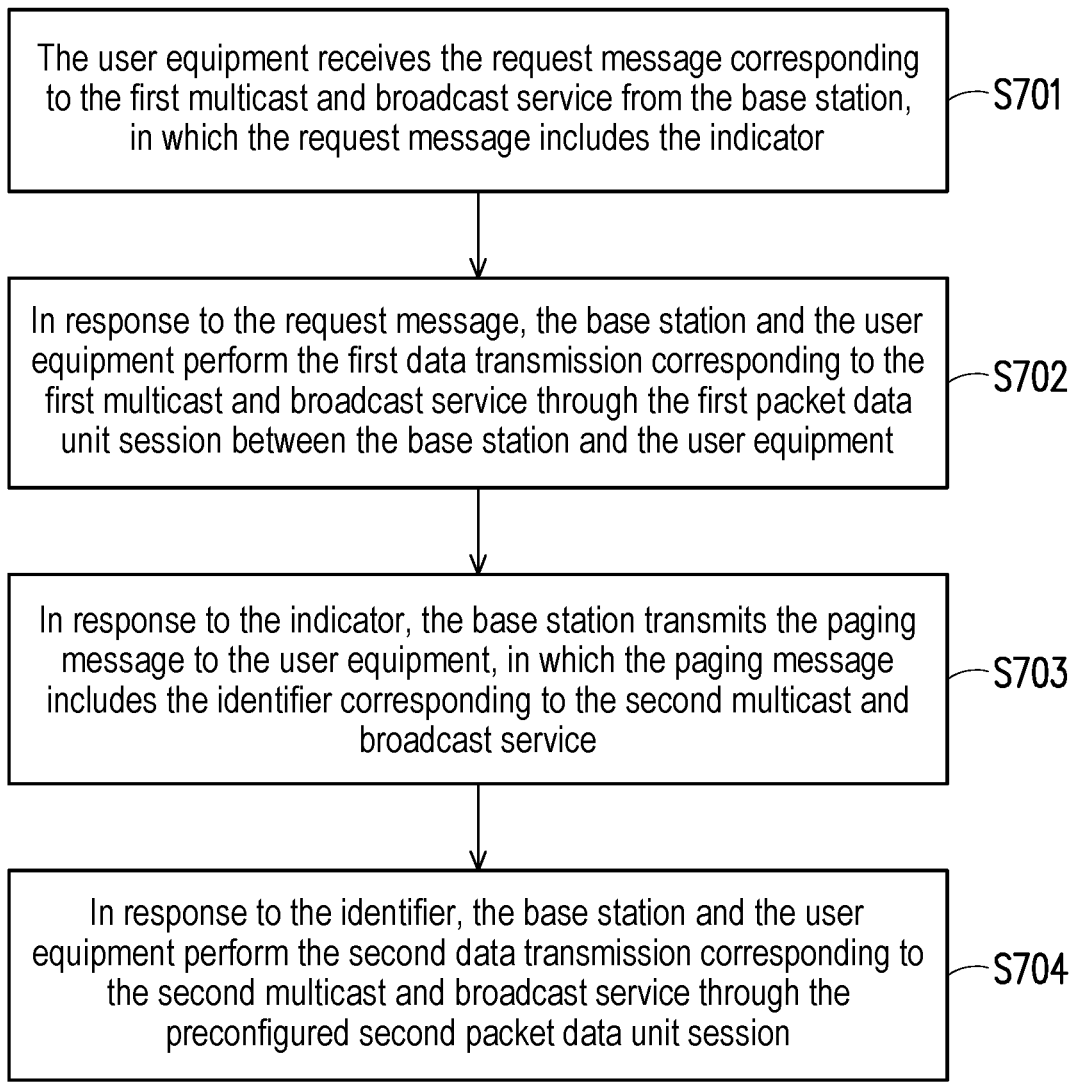
FIG. 7 is a flowchart of a method for an MBS applicable to a communication system according to an embodiment of the disclosure.

FIG. 7 is a flowchart of a method for an MBS applicable to a communication system according to an embodiment of the disclosure. The communication system may include the user equipment and the base station communicating with the user equipment. In step S701, the user equipment receives the request message corresponding to the first multicast and broadcast service from the base station. The request message includes the indicator. In step S702, in response to the request message, the base station and the user equipment perform the first data transmission corresponding to the first multicast and broadcast service through the first packet data unit session between the base station and the user equipment. In step S703, in response to the indicator, the base station transmits the paging message to the user equipment. The paging message includes the identifier corresponding to the second multicast and broadcast service. In step S704, in response to the identifier, the base station and the user equipment perform the second data transmission corresponding to the second multicast and broadcast service through the preconfigured second packet data unit session.

Figure 8:
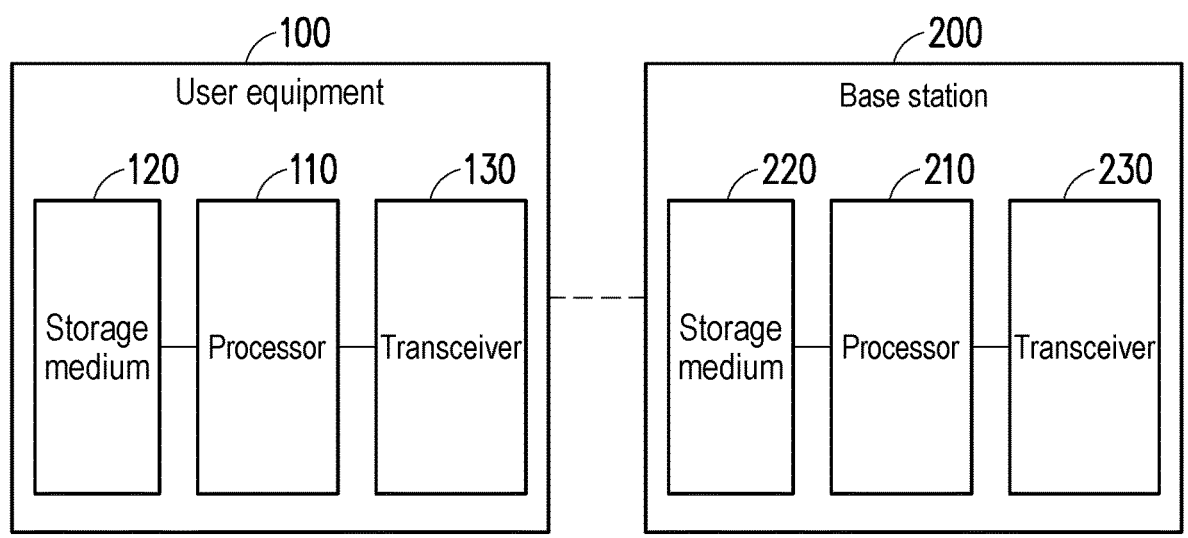
FIG. 8 is a schematic diagram of a communication system for an MBS according to an embodiment of the disclosure.

FIG. 8 is a schematic diagram of a communication system 10 for an MBS according to an embodiment of the disclosure. The communication system 10 may include a user equipment 100 and a base station 200 communicating with the user equipment 100. The communication system 10, the user equipment 100, or the base station 200 may be used to implement various functions or steps as shown in FIGS. 1 to 7.

The user equipment 100 may include a processor 110, a storage medium 120, and a transceiver 130. The processor 110 is, for example, a central processing unit (CPU), or other programmable general-purpose or specific-purpose micro control units (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), other similar elements, or a combination of the above elements. The processor 110 may be coupled to the storage medium 120 and the transceiver 130, and access and execute multiple modules and various application programs stored in the storage medium 120.

The storage medium 120 is, for example, any type of fixed or removable random access memory (RAM), read-only memory (ROM), flash memory, hard disk drive (HDD), solid state drive (SSD), similar elements, or a combination of the above elements, and is used to store the modules or the various application programs that may be executed by the processor 110.

The transceiver 130 transmits and receives signals in a wireless or wired manner. The transceiver 130 may further perform operations such as low noise amplification, impedance matching, frequency mixing, upward or downward frequency conversion, filtering, amplification, and the like.

The base station 200 may include a processor 210, a storage medium 220, and a transceiver 230. The processor 210 is, for example, a central processing unit, or other programmable general-purpose or specific-purpose micro control units, a microprocessor, a digital signal processor, a programmable controller, an application specific integrated circuit, a graphics processing unit, an image signal processor, an image processing unit, an arithmetic logic unit, a complex programmable logic device, a field programmable gate array, other similar elements, or a combination of the above elements. The processor 210 may be coupled to the storage medium 220 and the transceiver 230, and access and execute multiple modules and various application programs stored in the storage medium 220.

The storage medium 220 is, for example, any type of fixed or removable random access memory, read-only memory, flash memory, hard disk drive, solid state drive, similar elements, or a combination of the above elements, and is used to store the modules or the various application programs that may be executed by the processor 210.

The transceiver 230 transmits and receives the signals in a wireless or wired manner. The transceiver 230 may further perform operations such as low noise amplification, impedance matching, frequency mixing, upward or downward frequency conversion, filtering, amplification, and the like.

Based on the above, the UE in the disclosure may transmit the indicator for requesting the MBS, the information of the timer, or the RAN list request to the base station through the request messages such as the PDU session establishment request or the PDU session modification request. If the request message includes the indicator, when the base station adds the new MBS, the base station may directly start providing the new MBS to the UE without asking the UE. In addition, when the UE leaves the RNA, the timer of the UE may be started. If the UE has not returned to the original RNA before the timer expires, the base station may automatically release the MBS received by the UE in the original RNA for the UE. Furthermore, the base station may request to provide the UE with the RAN list supporting the MBS based on the RAN list, so as to prevent the UE from handing over to the RAN that does not support the MBS, thereby ensuring continuity of MBS transmission. Accordingly, in the disclosure, the amount of signaling that is required to be exchanged between the UE and the base station may be significantly reduced, thereby achieving an effect of saving power for the UE.

What is claimed is:

1. A user equipment for multicast and broadcast services, comprising:
    a transceiver communicating with a base station; and
    a processor configured to:
       transmit a request message corresponding to a first multicast and broadcast service to the base station, wherein the request message comprises an indicator;
       in response to transmitting the request message, perform a first data transmission corresponding to the first multicast and broadcast service through a first packet data unit session between the user equipment and the base station;
       in response to transmitting the indicator, receive a paging message from the base station, wherein the paging message comprises an identifier corresponding to a second multicast and broadcast service; and
       in response to receiving the identifier, perform a second data transmission corresponding to the second multicast and broadcast service through a preconfigured second packet data unit session,
    wherein the base station belongs to a radio access network notification area, and the request message further comprises information of a timer, wherein
       in response to the user equipment leaving the radio access network notification area, the timer is started; and
       in response to the timer expiring, the second packet data unit session is released.

2. The user equipment according to claim 1, wherein the second packet data unit session is the first packet data unit session.

3. The user equipment according to claim 1, wherein the processor is further configured to:
    before receiving the paging message, transmit a parameter for establishing the second packet data unit session to the base station.

4. The user equipment according to claim 1, wherein
    in response to the user equipment entering the radio access network notification area, the timer is stopped.

5. The user equipment according to claim 1, wherein the request message further comprises a radio access network list request, and the processor is further configured to:
    receive the second multicast and broadcast service provided by the base station through a first radio access network;
    in response to transmitting the radio access network list request, receive a radio access network list, wherein the radio access network list comprises a second radio access network; and
    hand over from the first radio access network to the second radio access network according to the radio access network list to perform the second data transmission corresponding to the second multicast and broadcast service.

6. The user equipment according to claim 1, wherein the processor is further configured to:
    enter a radio resource control inactive state;
    in response to receiving the paging message, perform a radio resource control resume procedure to switch from the radio resource control inactive state to a radio resource control connection state; and
    perform the second data transmission during the radio resource control connection state.

7. The user equipment according to claim 1, wherein the request message comprises one of a packet data unit session establishment request and a packet data unit session modification request.

8. The user equipment according to claim 7, wherein the indicator is comprised in an information element of extended protocol configuration options of the request message.

9. A base station for multicast and broadcast services, comprising:
    a transceiver communicating with a user equipment; and
    a processor configured to:
       receive a request message corresponding to a first multicast and broadcast service from the user equipment, wherein the request message comprises an indicator;
       in response to receiving the request message, perform a first data transmission corresponding to the first multicast and broadcast service through a first packet data unit session between the base station and the user equipment;
       in response to receiving the indicator, transmit a paging message to the user equipment, wherein the paging message comprises an identifier corresponding to a second multicast and broadcast service; and
       in response to transmitting the identifier, perform a second data transmission corresponding to the second multicast and broadcast service through a preconfigured second packet data unit session, wherein the base station belongs to a radio access network notification area, and the request message further comprises information of a timer, wherein the processor is further configured to:
  in response to detecting that the user equipment leaves the radio access network notification area, start the timer; and
  in response to the timer expiring, release the second packet data unit session.

10. The base station according to claim 9, wherein the second packet data unit session is the first packet data unit session.

11. The base station according to claim 9, wherein the processor is further configured to:
  before transmitting the paging message, receive a parameter for establishing the second packet data unit session from the user equipment.

12. The base station according to claim 9, wherein the processor is further configured to:
  in response to detecting that the user equipment enters the radio access network notification area, stop the timer.

13. The base station according to claim 9, wherein the request message further comprises a radio access network list request, and the processor is further configured to:
  provide the second multicast and broadcast service to the user equipment through a first radio access network;
  in response to receiving the radio access network list request, transmit a radio access network list, wherein the radio access network list comprises a second radio access network; and
  in response to transmitting the radio access network list, hand over the user equipment from the first radio access network to the second radio access network.

14. The base station according to claim 9, wherein the processor is further configured to:
  configure the user equipment to enter a radio resource control inactive state;
  in response to transmitting the paging message, perform a radio resource control resume procedure to switch the user equipment from the radio resource control inactive state to a radio resource control connection state; and
  perform the second data transmission when the user equipment is in the radio resource control connection state.

15. The base station according to claim 9, wherein the request message comprises one of a packet data unit session establishment request and a packet data unit session modification request.

16. The base station according to claim 15, wherein the indicator is comprised in an information element of extended protocol configuration options of the request message.

17. A communication system for multicast and broadcast services, comprising a user equipment and a base station, wherein
  the user equipment receives a request message corresponding to a first multicast and broadcast service from the base station, wherein the request message comprises an indicator;
  in response to the request message, the base station and the user equipment perform a first data transmission corresponding to the first multicast and broadcast service through a first packet data unit session between the base station and the user equipment;
  in response to the indicator, the base station transmits a paging message to the user equipment, wherein the paging message comprises an identifier corresponding to a second multicast and broadcast service; and
  in response to the identifier, the base station and the user equipment perform a second data transmission corresponding to the second multicast and broadcast service through a preconfigured second packet data unit session,
  wherein the base station belongs to a radio access network notification area, and the request message further comprises information of a timer, wherein
  in response to the user equipment leaving the radio access network notification area, the base station starts the timer; and
  in response to the timer expiring, the base station releases the second packet data unit session.

* * * * *